United States Patent
Moshchenko et al.

(10) Patent No.: US 12,427,599 B2
(45) Date of Patent: Sep. 30, 2025

(54) METHOD FOR WELDING PRECIPITATION-HARDENED SUPERALLOYS

(71) Applicant: Siemens Energy Global GmbH & Co. KG, Munich (DE)

(72) Inventors: Maxim Moshchenko, Klin (RU); Mikhail Ryazanov, Moskau (RU)

(73) Assignee: Siemens Energy Global GmbH & Co. KG, Munich (DE)

( * ) Notice: Subject to any disclaimer, the term of this patent is extended or adjusted under 35 U.S.C. 154(b) by 696 days.

(21) Appl. No.: 16/606,513

(22) PCT Filed: Apr. 19, 2017

(86) PCT No.: PCT/RU2017/000247
§ 371 (c)(1),
(2) Date: Oct. 18, 2019

(87) PCT Pub. No.: WO2018/194479
PCT Pub. Date: Oct. 25, 2018

(65) Prior Publication Data
US 2020/0070278 A1    Mar. 5, 2020

(51) Int. Cl.
*B23K 26/00* (2014.01)
*B23K 15/00* (2006.01)
(Continued)

(52) U.S. Cl.
CPC ........ *B23K 26/0006* (2013.01); *B23K 15/002* (2013.01); *B23K 15/0046* (2013.01);
(Continued)

(58) Field of Classification Search
CPC .............. B23K 26/0006; B23K 15/002; B23K 15/0046; B23K 26/21; B23K 2103/26; B23K 26/08; C22B 9/223
See application file for complete search history.

(56) References Cited

U.S. PATENT DOCUMENTS

| | | | |
|---|---|---|---|
| 4,263,496 A | * | 4/1981 | Medlar ............. B23K 15/0053 219/121.28 |
| 5,509,980 A | | 4/1996 | Lim |

(Continued)

FOREIGN PATENT DOCUMENTS

| DE | 102014105941 | | 11/2014 | |
|---|---|---|---|---|
| DE | 102014105941 | A1 * | 11/2014 | ............. B23K 26/24 |

(Continued)

OTHER PUBLICATIONS

DE-102014105941-A1 (Year: 2014).*

(Continued)

*Primary Examiner* — Steven W Crabb
*Assistant Examiner* — Fahmida Ferdousi
(74) *Attorney, Agent, or Firm* — Cozen O'Connor

(57) ABSTRACT

System and method for welding a precipitation-hardened superalloy, e.g., Nickel-based superalloy, article to produce a weld joint, wherein one or more sections are defined longitudinally within the entire length of the weld joint to be produced, melting of superalloy material adjacent the weld joint to be produced in one of the one or more sections is subsequently performed, by directing a power beam towards the section and longitudinally oscillating the power beam within the section, an intensity of the power beam and a frequency of oscillation of the power beam are selected such that the superalloy material adjacent the weld joint to be produced are caused to become uniformly heated and melt thereby producing the weld joint from the consolidation of the superalloy material so melted, where the weld joint is (Continued)

thereafter solidified by gradually reducing the power beam intensity while oscillating longitudinally the power beam within the section.

16 Claims, 2 Drawing Sheets

(51) Int. Cl.
*B23K 26/08* (2014.01)
*B23K 26/082* (2014.01)
*B23K 26/21* (2014.01)
*B23K 103/18* (2006.01)
*C22B 9/22* (2006.01)

(52) U.S. Cl.
CPC ........ *B23K 26/082* (2015.10); *B23K 26/0869* (2013.01); *B23K 26/21* (2015.10); *C22B 9/223* (2013.01); *B23K 2103/26* (2018.08)

(56) References Cited

U.S. PATENT DOCUMENTS

| | | | |
|---|---|---|---|
| 6,333,484 B1 | 12/2001 | Foster et al. | |
| 7,653,995 B2 | 2/2010 | Morin | |
| 7,854,064 B2* | 12/2010 | Malley | B23K 15/0033 |
| | | | 29/402.06 |
| 2006/0042729 A1* | 3/2006 | Kottilingam | C22F 1/10 |
| | | | 148/675 |
| 2015/0050157 A1* | 2/2015 | Ozbaysal | F01D 5/005 |
| | | | 148/525 |
| 2015/0369064 A1* | 12/2015 | Bruck | F01D 5/326 |
| | | | 228/110.1 |
| 2017/0232553 A1* | 8/2017 | Sievi | B23K 26/0643 |
| | | | 219/121.64 |

FOREIGN PATENT DOCUMENTS

| | | | | |
|---|---|---|---|---|
| GB | 2055317 | | 3/1981 | |
| GB | 2055317 A | * | 3/1981 | ......... B23K 15/0053 |
| JP | S 53-4506 B2 | | 2/1978 | |
| JP | S 58-103981 | | 6/1983 | |
| JP | S 58-173089 | | 10/1983 | |
| JP | 2005219115 A | * | 8/2005 | |

OTHER PUBLICATIONS

Special Metals, SMC-011, 2004 (Year: 2004).*
JP-2005219115-A (Year: 2005).*
Https://www.phase-trans.msm.cam.ac.uk/2003/Superalloys/superalloys. html, Mar. 19, 2017 (Year: 2017).*
Https://en.wikipedia.org/wiki/Chemical_composition, Dec. 20, 2016 (Year: 2016).*
Office Action dated Jan. 28, 2021 issued in Chinese Patent Application Serial No. 201780089822.3.
International Search Report dated Nov. 17, 2017 based on PCT/RU2017/000247 filed Apr. 19, 2017.

* cited by examiner

METHOD FOR WELDING PRECIPITATION-HARDENED SUPERALLOYS

CROSS-REFERENCE TO RELATED APPLICATIONS

This is a U.S. national stage of application No. PCT/RU2017/000247 filed Apr. 19, 2017, the content of which is incorporated herein by reference in its entirety.

BACKGROUND OF THE INVENTION

1. Field of the Invention

The present invention relates to a method for welding precipitation-hardened superalloys and, more particularly, to a method and a system for welding a precipitation-hardened superalloy article to produce a weld joint.

2. Description of the Related Art

Precipitation hardening, also called Precipitation strengthening or age hardening, is a well known heat treatment technique used to increase the yield strength of malleable materials. Precipitation hardening is beneficially used to increase the yield strength of many structural alloys, such as alloys of aluminium, magnesium, nickel, titanium, and some steels and stainless steels. A specific example of use of precipitation hardening is processing of superalloys, such as Nickel-based alloys (Ni-based alloys), which are extensively used for high-duty components of combustion engines and gas turbines due to their outstanding mechanical properties and corrosion/oxidation resistance at elevated temperatures. Welding processes are often required in manufacturing and/or repair such components.

The superior mechanical properties of such precipitation-hardened or precipitation-strengthened material or alloys are attributed to the presence of secondary phase precipitates formed in the precipitation hardening or precipitation strengthening material or alloys as a result of precipitation hardening, such as presence of gamma prime (y') phase in Ni-based superalloys which contributes to precipitation strengthening of the material. The higher the amount of gamma prime phase in the precipitation-hardened material or alloy, the higher the mechanical strength.

However, such precipitation-hardened material or superalloys comprising relatively high contents of secondary phase precipitates, such as gamma prime phase in Ni-based superalloys, are susceptible to cracking during welding or during post-weld heat treatment. As a result, such precipitation-hardened material or superalloys are difficult to weld. Two types of cracking can develop when welding such precipitation-hardened material or superalloys, such as high strength Ni-based superalloys: hot cracking that occurs during the welding process while the weld material is solidifying, and strain-age cracking that occurs during the post-weld aging heat treatment.

Several techniques are presently used to improve the weldability of precipitation-hardened alloys, and particularly of Ni-based superalloys. One known way to improve the weldability of Ni-based superalloys is to subject the materials to a pre-weld overageing treatment. Conventional pre-weld overageing treatments involve heating the material to the solutionizing temperature to dissolve the strengthening gamma prime phase, followed by slow cooling to allow the gamma prime phase to reprecipitate out as coarse particles. This increases ductility of the material, thus helping to limit the build-up of residual stress produced by welding.

U.S. Pat. No. 5,509,980 A discloses a pre-weld overageing heat treatment for nickel-based superalloys, where the alloy is heated to solutionization temperature for a time sufficient to dissolve the gamma prime phase of the alloy microstructure, then slowly cooled with periods of intermittent heating, so that the gamma prime phase reprecipitates as coarse equiaxed particles, and the presence of fine sized gamma prime phase particles is substantially avoided. U.S. Pat. No. 5,509,980 A further discloses a welding method, where the aforementioned pre-weld overageing treatment is used.

U.S. Pat. No. 7,653,995 discloses a method of weld repairing a superalloy material at ambient temperature without causing cracking of the base material. In the method disclosed in U.S. Pat. No. 7,653,995, a superalloy material, such as CM-247 LC, is subjected to an overageing pre-weld heat treatment in order to grow the volume percentage of gamma prime precipitate in the material to a level sufficient to permit ambient temperature welding without cracking. CM-247 LC material is heated in a vacuum furnace at a rate of about 0.5° C. per minute to an intermediate temperature of about 885° C. The material is then gas fan quenched to a temperature of about 52° C. to grow the gamma prime precipitate percentage to about 55%. U.S. Pat. No. 7,653,995 explains that a fusion repair weld may then be performed on the material at an ambient temperature using a filler material having a chemistry matching a chemistry of the base material.

U.S. Pat. No. 6,333,484 discloses a welding technique, where the entire weld area is preheated to a maximum ductility temperature range, and this elevated temperature is maintained during the welding and solidification of the weld.

The aforementioned techniques require pre-weld treatment steps and thus result in increased complexity, higher energy consumption and lengthened manufacturing/repairing process time. Thus, there exists a need for a technique for welding precipitation-hardened materials or alloys.

SUMMARY OF THE INVENTION

In view of the foregoing, it is therefore an object of the present invention to provide a method, in particular a method and a system for welding precipitation-hardened materials or alloys, such as Ni-based superalloys, in a manner that is free of any pre-weld heat treatment steps, as aforementioned for the conventional techniques, and thereby simpler and with shortened manufacturing/repairing process times, and is beneficial to reduce the risk of cracking and thereby enhances the quality of weldments.

These and other objects and advantages are achieved in accordance with the invention by a method for welding a precipitation-hardened superalloy article to produce a weld joint, and by a system for welding a precipitation-hardened superalloy article to produce a weld joint.

In an embodiment of the present invention, a method for welding a precipitation-hardened superalloy article to produce a weld joint is presented. The precipitation-hardened superalloy may be Nickel-based superalloy, such as Nickel-based superalloy, having a percentage by volume of gamma prime phase equal to or greater than 45 percentage by volume.

In the method, one or more sections are defined longitudinally from within a whole length of the weld joint to be produced. Subsequently, melting of superalloy material adjacent the weld joint to be produced in one or more sections is performed. The melting is performed by directing a power beam towards the section and longitudinally oscillating the power beam within the section. The power beam is generated by a beam source, such as a Laser beam welding beam source, e.g., a Laser emitter, an electron beam welding beam source, e.g., an electron gun. The power beam is oscillated longitudinally within the section by oscillating a beam source generating the power beam, by oscillating the beam itself while keeping the beam source generating the power beam stationary, or by a combination of oscillating the power beam along with oscillating the beam source. An intensity of the power beam and a frequency of oscillation of the power beam are selected such that the superalloy material adjacent the weld joint to be produced are caused to become uniformly heated and melt, thereby producing the weld joint from the consolidation of the superalloy material so melted. The term "consolidation" as used herein includes to come together to form one mass or whole, or act of coalescing and subsequent solidification.

In the present disclosure, the phrase "oscillation of the power beam" or "oscillation of the beam" means changing the direction of the beam by physically moving the beam source or by keeping the beam source fixed and changing the direction of the beam.

Thereafter, in the method the weld joint is solidified by reducing gradually, the intensity of the power beam while oscillating longitudinally the power beam within the section. In reducing gradually the intensity of the power beam while oscillating longitudinally the power beam within the section, a frequency of oscillation of the power beam may be the same as the frequency of oscillation of the power beam in melting the superalloy material adjacent the weld joint to be produced. Furthermore, in gradually reducing the intensity of the power beam while longitudinally oscillating the power beam within the section, the gradual reduction of the intensity of the power beam while longitudinally oscillating the power beam within the section may be performed until a temperature of the weld joint reaches between 600° C. and 700° C.

The present method does not require any pre-weld heat treatment steps or any other step resulting from any pre-weld heat treatment step, thus allowing the reduction of the energy consumption and the shortening of the manufacturing/repairing process time. By using an oscillating power beam along with an appropriate intensity for the power beam during solidification of the weld joint, the present technique allows a decrease of the cooling rates which, in turn, would lead to lower gamma/gamma prime lattice misfit and lower internal stresses at the interface between gamma prime particles and the gamma matrix in the microstructure of the superalloy. The reduction of internal stresses is beneficial for reducing the risk of cracking and thereby enhances the quality of weldments.

In an embodiment of the method, when there are multiple sections defined longitudinally from within the whole length of the weld joint to be produced the melting of the superalloy material to produce the weld joint and solidifying the weld joint is performed separately for different sections. The length of each of the sections so defined is between 10 mm and 100 mm.

In another embodiment of the present invention, a system for welding a precipitation-hardened superalloy article to produce a weld joint is presented. The system includes a beam source, an oscillation mechanism and a control unit. The beam source generates a power beam. The beam source is configured to vary the intensity of the power beam generated, i.e., to achieve a desired intensity of the power beam and to increase and/or decrease the intensity from the desired intensity. The beam source may be a laser beam welding beam source or an electron beam welding beam source. The oscillation mechanism induces and/or varies an oscillation of the power beam.

The control unit defines longitudinally one or more sections within a whole length of the weld joint to be produced. The control unit controls the oscillation mechanism to effect longitudinal oscillations, with a selected frequency, of the power beam within one of the one or more sections, and controls the beam source to provide a selected intensity of the power beam. The selected intensity and the selected frequency are such that the superalloy material adjacent the weld joint to be produced are caused to become uniformly heated and melt thereby producing the weld joint from the consolidation of the superalloy material so melted.

Furthermore, the control unit controls the beam source to reduce gradually the intensity of the power beam from the selected intensity while controlling the oscillation mechanism to longitudinally oscillate the power beam. In a related embodiment of the system, the control unit controls the beam source to gradually reduce the intensity of the power beam from the selected intensity while controlling the oscillation mechanism to longitudinally oscillate the power beam with the selected frequency.

In an embodiment of the system of the present invention, the control unit longitudinally defines the one or more sections having a length of each of the sections so defined between 10 mm and 100 mm.

In another embodiment of the system, the oscillation mechanism induces and/or varies the oscillation of the power beam by inducing and/or varying oscillations in the beam source or by repeatedly altering direction of movement of the particles, such as the electrons, forming the power beam or by both.

In another embodiment of the system, the control unit further controls the oscillation mechanism to stop longitudinally oscillating the power beam when a temperature, as detected by a temperature sensor, of the weld joint reaches between 600° C. and 700° C. while reducing gradually the intensity of the power beam.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present technique is further described hereinafter with reference to illustrated embodiments shown in the accompanying drawing, in which.

DETAILED DESCRIPTION OF THE EXEMPLARY EMBODIMENTS

Figure 1:
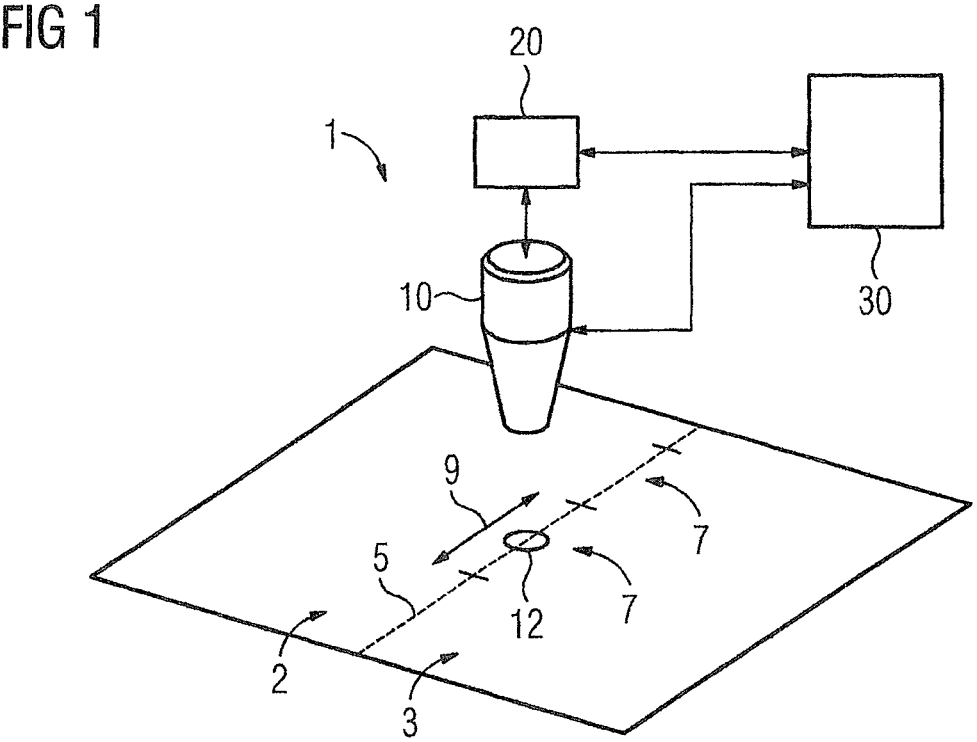
FIG. 1 schematically illustrates an exemplary embodiment of a system for welding a precipitation-hardened superalloy article to produce a weld joint, in accordance with the present invention.

Hereinafter, above-mentioned and other features of the present technique are described in details. Various embodiments are described with reference to the drawing, where like reference numerals are used to refer to like elements throughout. In the following description, for purposes of explanation, numerous specific details are set forth to provide a thorough understanding of one or more embodiments. It may be noted that the illustrated embodiments are intended to explain, and not to limit the invention. It may be evident that such embodiments may be practiced without these specific details.

It may be noted that in the present disclosure, the terms "first", "second", etc. are used herein only to facilitate discussion, and carry no particular temporal or chronological significance unless otherwise indicated.

The present invention provides a technique for welding a precipitation-hardened superalloy article to produce a weld joint. The precipitation-hardened superalloy may be a Nickel based superalloy for example a Nickel-based superalloy having a percentage by volume of gamma prime phase equal to or greater than 45 percentage by volume. A specific example of precipitation-hardened superalloy is a directionally solidified (DS) cast nickel-based superalloy material sold by Cannon-Muskegon Corporation under the designation CM-247 LC. CM-247 LC is known to have the following nominal composition, expressed as weight percentages: carbon 0.07%; chrome 8%; cobalt 9%; molybdenum 0.5%; tungsten 10%; tantalum 3.2%; titanium 0.7%; aluminum 5.6%; boron 0.015%; zirconium 0.01%; hafnium 1.4%; and the balance nickel. The article made from the precipitation-hardened superalloy, hereinafter referred to as the superalloy, may be a component of a gas turbine, such as a blade or a vane of a gas turbine or any other components of a gas turbine that are subjected to hot gas flow in the gas turbine such as a heat shield. The present invention is used for welding such articles. In welding an appropriate filler material, e.g., filler material (Mar-M247) for CM-247 LC as base material, may be used.

When the tendency to cracking in high volume fraction precipitate strengthened alloys, such as Nickel-based superalloy having 45 percentage by volume, or greater, of gamma prime phase, is considered, one of the crucial parameters is a value of the lattice misfit between the precipitate and the base metal phases. In Ni-based superalloys, a large gamma/gamma prime (y/y') lattice misfit results in formation of internal misfit stresses at the interface between gamma prime particles and the metal gamma matrix which, being superimposed with thermally-induced (tensile) stresses formed during solidification of the weld bead, would lead to micro-cracking of the material after welding. It is thus advantageous to minimize the gamma/gamma prime misfit in terms of preventing the risk of cracking.

Figure 2:
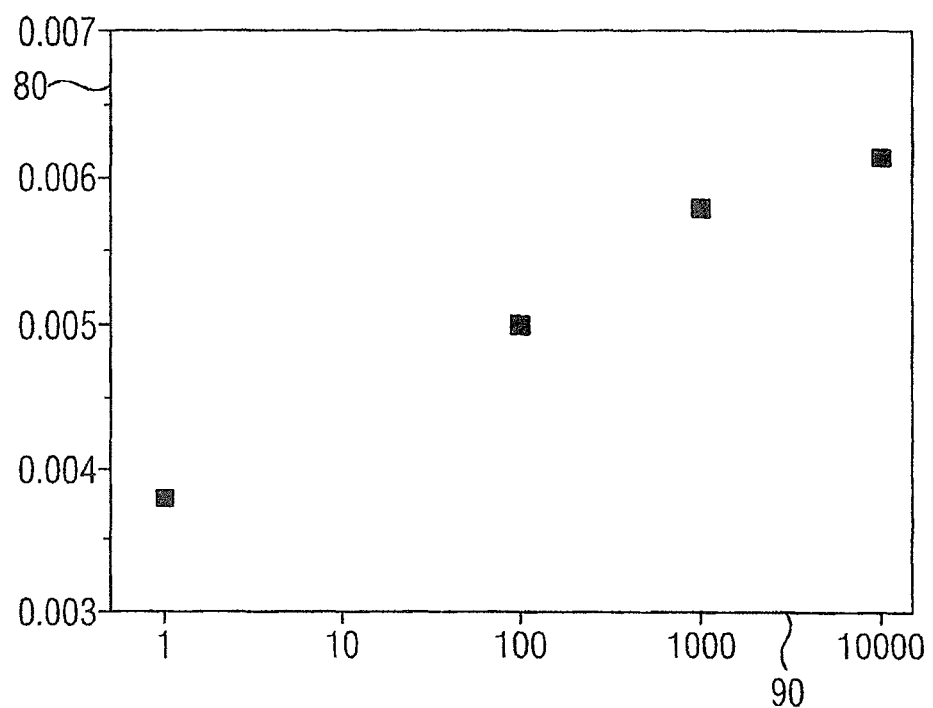
FIG. 2 is a graphical plot illustrating the effect of the cooling rate on the gamma/gamma prime lattice misfit calculated for CM-247 LC superalloy.

As can be seen in FIG. 2, the magnitude of the gamma/gamma prime lattice misfit depends considerably on the cooling rate during solidification, i.e., the lower the cooling rate of the weld joint the lower is the gamma/gamma prime lattice misfit, and lesser is the risk of cracking in the weld joint. FIG. 2 is a graphical plot illustrating the effect of the cooling rate on the gamma/gamma prime lattice misfit calculated for alloy CM-247 LC with a gamma prime fraction of about 60 vol %. This desired lower cooling rate for the weld joint and, more specifically for the welded bead, is achieved by the present technique. In FIG. 2, axis 80 represents gamma/gamma prime lattice misfit and axis 90 represents cooling rate in degC/s (degree Centigrade per second).

Figure 3:
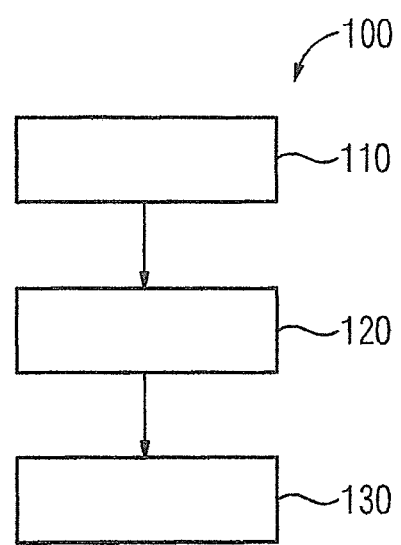
FIG. 3 is a flowchart of the method in accordance with the present invention.

Hereinafter, the steps of a method 100, as shown in FIG. 3, of the present invention and a system 1 in accordance with embodiments of the present invention are explained with reference to FIG. 1. The present invention is used to weld precipitation-hardened superalloy that have been referred hereinafter simply to as superalloy.

The system 1 for welding a precipitation-hardened superalloy article to produce a weld joint 5 is shown in FIG. 1. In the exemplary embodiment of FIG. 1, two parts i.e., a part 2 and a part 3 are intended to be welded together. The parts 2,3 may be parts of the same article, for example, one part may be a chipped part or a replacement for a chipped part of a heat shield and the other part may be the remaining body of the heat shield. The parts 2,3 may be two different articles that are two be welded to each other. As shown in FIG. 1, the parts 2,3 are intended to be welded to each other and consequently the weld joint 5 is desired to be produced. The weld joint 5 may be produced by welding the parts 2,3 to each other with or without suitable filled material. The parts 2,3 or at least the regions of the parts 2,3 that are adjacent to the weld joint 5 to be produced are formed of superalloys. The weld joint 5 to be produced between the parts 2,3 has been represented by dashed line 5.

As shown in FIG. 1, the weld joint 5 to be produced is divided into one or more sections 7. It should be noted that for sake of better understanding three short line segments have been used on the weld joint 5 to demarcate two sections 7, however in application of the present invention no such visual demarcation is required. It should also be noted that in FIG. 1 only two sections 7 have been depicted however it may be appreciated by one skilled in the art that several such sections 7 are possible, depending on the entire length or length of the weld joint 5 to be produced and upon a length of the sections 7. In one embodiment of the present invention, each such section 7 is between 10 mm and 100 mm long. The present invention is applied on each section 7 separately and independently of rest of the sections 7. For example, the present invention may be applied for one of the sections 7 and then after the present invention has concluded with respect to that section 7, it may subsequently be applied to an adjacent section 7, and then to another section 7. In another example, the present invention may be applied simultaneously for multiple sections 7, and then after the present invention has concluded with respect to the one or more such sections 7, it may subsequently be applied to one or more adjacent section 7. The entire length of the weld joint 5 is welded only when all the sections 7 have been subjected to the present invention.

The system 1 includes a beam source 10, an oscillation mechanism 20 and a control unit 30. The beam source 10 generates a power beam. In FIG. 1, a spot 12 is depicted to schematically represent the power beam as projected on the parts 2, 3 and the weld joint 5 to be produced. For the purpose of explanation, the present invention has been explained hereinafter with respect to the section 7 in FIG. 1 that has the spot 12 within. The beam source 10 may be a laser beam welding beam source or an electron beam welding beam source. The beam source 10 is configured to vary intensity of the power beam generated, i.e., to achieve a desired intensity of the power beam and to increase and/or decrease the intensity from the desired intensity. The beam sources 10 used for welding of superalloys and, more particularly, the beam sources used in the electron beam welding and laser beam welding and mechanisms and techniques to vary the intensity of such beam sources are well known in the art of welding and thus not explained herein in further details for sake of brevity.

The oscillation mechanism 20 induces and/or varies an oscillation of the power beam. This is achieved by inducing and/or varying an oscillation of the beam source 10, or by inducing and/or varying an oscillation of the beam generated by the beam source 10, or by a combination thereof. The oscillation mechanism 20 may comprise a motor, a variable-frequency drive, a motor controller and so on and so forth to enable introduction of and variation in oscillations of the beam source 10. Alternatively or additionally to the aforementioned construct of the oscillation mechanism 20, the oscillation mechanism 20 may comprise a system or arrangement (not shown) of electromagnetic lenses, or also referred to as magnetic lenses. The electromagnetic lenses focus and/or deflect, and thus are capable of performing oscillations, of moving charged particles, such as electrons forming the electron beam, when the beam source is an electron gun. The charged particles making up the electron beam are acted upon by the Lorentz force to deflect them from one direction to another, and thus enabling causation of a to-and-fro motion of the power beam along a given axis.

An electromagnetic lens generally includes several electromagnets arranged in a quadrupole, sextupole, or higher format, i.e., the electromagnetic coils are placed at the vertices of a square or another regular polygon. From this configuration, a customized magnetic field can be formed to manipulate the particles, i.e., the electrons forming the power beam, and consequently to manipulate or alter the beam direction. In an exemplary embodiment of the system 1, the beam source 10 is a laser emitter and the oscillation mechanism 20 comprises drives that physically move the laser emitter to cause oscillation of the laser beam. In another embodiment, the beam source 10 is an electron gun and the oscillation mechanism 20 comprises a system of electromagnetic lenses that move the electrons of the power beam to cause oscillation of the beam, without physically oscillating the electron gun.

The oscillation mechanism 20 controls or performs on the power beam or the beam source 10, as mentioned hereinabove, to start oscillation of the power beam and/or the beam source 10, to stop oscillation of the power beam and/or the beam source 10, to increase or decrease oscillations of the power beam and/or the beam source 10, and/or to maintain oscillations of the power beam and/or the beam source 10 at a desired frequency. The oscillation mechanism 20 also functions to limit the oscillations of the power beam or the beam source 10 such that the spot 12 is maintained within the section 7 for which the present technique is being performed. The oscillations are performed in a direction 9 extending lengthwise along the section 7.

The control unit 30 longitudinally defines one or more sections 7 from within the entire length of the weld joint 5 to be produced. The entire length of the weld joint 5 may be provided manually to the control unit 30 by a user or may be determined by the control unit 30 based on pointers provided by the user to show at least two locations between which the weld joint 5 is to be produced.

The control unit 30 controls the oscillation mechanism 20 to effect longitudinal oscillations, with a selected frequency, of the power beam within one or more sections 7, and controls the beam source 10 to provide a selected intensity of the power beam. The selected intensity and the selected frequency are such that the superalloy material adjacent the weld joint 5 are caused to be produced to become uniformly heated and melt thereby producing the weld joint 5 from the consolidation of the superalloy material so melted.

Furthermore, the control unit 30 controls the beam source 10 to gradually reduce the intensity of the power beam from the selected intensity while controlling the oscillation mechanism 20 to longitudinally oscillate the power beam. The beam source 10 and/or the power beam may be oscillated by the oscillation mechanism 20 with a uniform frequency or same frequency, i.e., the selected frequency, during the melting and then later during the solidification of the weld joint 5.

With reference to FIG. 3, the method 100 of the present invention may be implemented by the system 1 of the present invention. In the method 100, one or more sections 7 are defined longitudinally in a step 110, as aforementioned, from within the entire length of the weld joint 5 to be produced. The rest of the steps of the method 100 are performed on one of the sections 7. Subsequently, superalloy material within that one section 7 and adjacent the weld joint 5 to be produced is melted in a step 120. The melting is performed by directing the power beam towards the section 7 and longitudinally oscillating the power beam within the section 7. The intensity of the power beam and the frequency of oscillation of the power beam are selected such that the superalloy material within the section 7 and adjacent the weld joint 5 are caused to be produced to become uniformly heated and melt thereby producing the weld joint 5 from the consolidation of the superalloy material so melted.

As a result of the uniform heating, the temperature of the parts of the section 7 or sub-sections of the section 7 rises uniformly or substantially similarly, and thereby avoiding formation of substantial thermal gradient within the subsections of the section 7. For example, two subsections or regions within the section 7 are said to be "uniformly" heated if a temperature difference between the two subsections or regions is within a range of zero and 50 degree centigrade at any given time instance during melting of the superalloy material within the section 7.

Thereafter, in the method 100 in a step 130 the weld joint 5 is solidified by gradually reducing the intensity of the power beam while longitudinally oscillating the power beam within the section 7. The phrase "gradually reducing" as used herein means at a uniform or consistent rate, or decreasing continuously or steadily, or decreasing non-intermittently or continually, or non-abruptly or non-sporadically. In gradually reducing the intensity of the power beam while oscillating longitudinally the power beam within the section 7, a frequency of oscillation of the power beam may be the same as the frequency of oscillation of the power beam that was maintained in melting the superalloy material in the previous step. Furthermore, in gradually reducing the intensity of the power beam while longitudinally oscillating the power beam within the section, the gradual reduction of the intensity of the power beam while longitudinally oscillating the power beam within the section may be performed until a temperature of the weld joint 5 reaches between 600° C. and 700° C. After the temperature of the weld joint 5 during cooling or solidification reaches between 600° C. and 700° C., the beam source 10 may be turned off, i.e., no further requirement of the power beam for that section 7 is needed. Furthermore, the oscillation of the beam source 10 and/or the power beam may also be stopped. As a result of no further projection of the power beam on the weld joint 5 within that section 7, the weld joint 5 within the section 7 cools thereafter naturally by convection to the ambient air or environment.

It may be noted that although the system 1 of the present invention and the method 100 of the present invention have been explained hereinabove for performing welding of the weld joint 5 with respect to one section 7, the system 1 and the method 100 can be used to simultaneously perform welding of the weld joint 5 with respect to multiple sections 7. For simultaneous welding of multiple sections 7, the system 1 would include multiple beam sources 10, or one beam source 10 accompanied by a beam splitter, an oscillation mechanism 20 associated with each of the multiple beams or the split beams, and a control unit 30 having one or more processors or processing module to control the one or more beam source 10 and/or to control the one or more oscillation mechanisms 20.

While the present technique has been described in detail with reference to certain embodiments, it should be appreciated that the present technique is not limited to those precise embodiments. Rather, in view of the present disclosure which describes exemplary modes for practicing the invention, many modifications and variations would present themselves, to those skilled in the art without departing from the scope and spirit of this invention. The scope of the invention is, therefore, indicated by the following claims rather than by the foregoing description. All changes, modifications, and variations coming within the meaning and range of equivalency of the claims are to be considered within their scope.

The invention claimed is:

1. A method for welding a precipitation-hardened superalloy article to produce a welded butt joint, the method comprising:
    defining longitudinally at least one section within an entire length of the butt joint to be produced;
    melting superalloy material adjacent the butt joint to be produced by directing a power beam towards the at least one section so defined and oscillating longitudinally the power beam within the section, an intensity of the power beam and a frequency of oscillation of the power beam being selected such that the superalloy material proximate to the butt joint is caused to be produced by becoming uniformly heated and melt thereby producing the butt joint from the consolidation of the superalloy material so melted; and
    solidifying the butt joint by gradually reducing the intensity of the power beam while oscillating longitudinally the power beam within the at least one section until a temperature of the butt joint within the at least one section reaches between 600° C. and 700° C.;
    wherein said melting of the superalloy material to produce the butt joint and solidifying the butt joint by gradually reducing the intensity of the power beam while oscillating longitudinally the power beam within the at least one section are performed separately for sections of the butt joint to be produced to decrease cooling rates of the superalloy material to within a range of 1 to 1000 degC/s, lower gamma/gamma prime lattice misfit, and lower internal stresses at an interface between gamma prime particles and a gamma matrix in a microstructure of the superalloy material.

2. The method according to claim 1, wherein a length of each defined section is between 10 mm and 100 mm.

3. The method according to claim 1, wherein the power beam is oscillated longitudinally within the section by one of (i) oscillating a beam source generating the power beam, (ii) oscillating the power beam while keeping the beam source fixed in position, and (iii) simultaneously oscillating the power beam and the beam source.

4. The method according to claim 1, wherein the power beam is generated by one of a laser beam welding beam source and an electron beam welding beam source.

5. The method according to claim 1, wherein when reducing gradually the intensity of the power beam while oscillating longitudinally the power beam within the section, the frequency of oscillation of the power beam is the same as the frequency of oscillation of the power beam when melting the superalloy material proximate to the butt joint to be produced.

6. The method according to claim 1, wherein when reducing gradually the intensity of the power beam while oscillating longitudinally the power beam within the section, the gradual reduction of the intensity of the power beam while oscillating longitudinally the power beam within the at least one section is performed until a temperature of the butt joint within the at least one section reaches between 600° C. and 700° C.

7. The method according to claim 1, wherein the precipitation-hardened superalloy comprises a Nickel-based superalloy.

8. The method according to claim 7, wherein the Nickel-based superalloy comprises a Nickel-based superalloy having a percentage by volume of gamma prime phase equal to or greater than 45 percentage by volume.

9. A system for welding a precipitation-hardened superalloy article to produce a welded butt joint, the system comprising:
    a beam source for generating a power beam, the beam source being configured to vary an intensity of the generated power beam;
    an oscillation mechanism configured to at least one of (i) induce and (ii) vary an oscillation of the power beam; and
    a control unit configured to:
        define longitudinally at least one section within an entire length of the butt joint to be produced;
        control the oscillation mechanism to longitudinally oscillate the power beam with a selected frequency within said at least one section, and control the beam source to provide a selected intensity of the power beam, the selected intensity and the selected frequency being such that the superalloy material proximate the butt joint to be produced is caused to become uniformly heated and melt to thereby produce the butt joint from the consolidation of the superalloy material so melted; and
        control the beam source to gradually reduce an intensity of the power beam from the selected intensity while controlling the oscillation mechanism to longitudinally oscillate the power beam until a temperature of the butt joint within the at least one section reaches between 600° C. and 700° C. and solidify the butt joint;
    wherein said melting of the superalloy material to produce the butt joint and solidifying the butt joint by gradually reducing the intensity of the power beam while oscillating longitudinally the power beam within the at least one section are performed separately for sections of the butt joint to be produced to decrease cooling rates of the superalloy material to within a range of 1 to 1000 degC/s, lower gamma/gamma prime lattice misfit, and lower internal stresses at an interface between gamma prime particles and a gamma matrix in a microstructure of the superalloy material.

10. The system according to claim 9, wherein the control unit is further configured to define longitudinally the at least one section having a length of each defined section between 10 mm and 100 mm.

11. The system according to claim 10, wherein the oscillation mechanism is configured to at least one of induce and vary the oscillation of the power beam by one of inducing and varying oscillations in the beam source, by at least one of inducing and varying oscillations in the power beam while keeping the beam source fixed in position, and at least one of by simultaneously inducing and varying oscillations in the power beam and the beam source.

12. The system according to claim 9, wherein the oscillation mechanism is configured to at least one of induce and vary the oscillation of the power beam by one of inducing and varying oscillations in the beam source, by at least one of inducing and varying oscillations in the power beam while keeping the beam source fixed in position, and by at least one of simultaneously inducing and varying oscillations in the power beam and the beam source.

13. The system according to claim 12, wherein the beam source is one of (i) a laser beam welding beam source and (ii) an electron beam welding beam source.

14. The system according to claim 9, wherein the beam source is one of (i) a laser beam welding beam source and (ii) an electron beam welding beam source.

15. The system according to claim 9, wherein the control unit is further configured to:
control the beam source to gradually reduce an intensity of the power beam from the selected intensity while controlling the oscillation mechanism to longitudinally oscillate the power beam with the selected frequency.

16. The system according to claim 9, wherein the control unit is further configured to at least one of:
(i) control the beam source to stop generating the power beam, and
(ii) control the oscillation mechanism to stop oscillating the power beam, when a temperature of the butt joint reaches between 600° C. and 700° C. while gradually reducing the intensity of the power beam.

* * * * *